United States Patent
Pan et al.

(10) Patent No.: US 12,242,895 B2
(45) Date of Patent: Mar. 4, 2025

(54) EVENT-DRIVEN PROVISIONING OF AN ELASTIC ORCHESTRATION PLATFORM

(71) Applicant: International Business Machines Corporation, Armonk, NY (US)

(72) Inventors: Xun Pan, Xi'an (CN); Guang Ya Liu, Xi'an (CN); Hai Hui Wang, Xi'an (CN); Peng Li, Xi'an (CN); Xiang Zhen Gan, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 616 days.

(21) Appl. No.: 17/452,251

(22) Filed: Oct. 26, 2021

(65) Prior Publication Data
US 2023/0126045 A1    Apr. 27, 2023

(51) Int. Cl.
*G06F 3/00* (2006.01)
*G06F 9/50* (2006.01)
(Continued)

(52) U.S. Cl.
CPC ............ *G06F 9/5038* (2013.01); *G06F 9/505* (2013.01); *G06F 9/5083* (2013.01); *G06F 9/54* (2013.01); *G06F 13/362* (2013.01)

(58) Field of Classification Search
CPC ........................................................ G06F 9/54
See application file for complete search history.

(56) References Cited

U.S. PATENT DOCUMENTS

| 11,004,024 B2 | 5/2021 | Wang | |
|---|---|---|---|
| 2004/0073668 A1* | 4/2004 | Bhat | G06F 21/6218 709/225 |

(Continued)

FOREIGN PATENT DOCUMENTS

| CN | 105281955 A | 1/2016 |
|---|---|---|
| CN | 112000441 A | 11/2020 |
| CN | 112492003 A | 3/2021 |
| CN | 112667362 A | 4/2021 |
| CN | 112925695 A | 6/2021 |

OTHER PUBLICATIONS

Hitesh Maruti Padekar, AEGIS: Validating Execution Behavior of Controller Applications in Software-Defined Networks . (Year: 2015).*

(Continued)

*Primary Examiner* — Lechi Truong
(74) *Attorney, Agent, or Firm* — Yee & Associates, P.C.

(57) ABSTRACT

Provisioning an orchestration platform is provided. A pre-application programming interface (API) server hook is used to preprocess a request to generate a custom resource in the orchestration platform. The pre-API server hook generates a custom resource definition corresponding to the custom resource and generates the custom resource based on the custom resource definition. A custom resource definition generation event is monitored for, using a custom resource definition (CRD) meta-controller, to manage a custom resource definition controller corresponding to the custom resource definition. The CRD meta-controller retrieves the custom resource definition controller from a CRD controller configuration repository to deploy the custom resource definition controller on a worker node in the orchestration platform. Data is distributed, using a data partition proxy, to the custom resource definition controller running the custom resource on the worker node to ensure that no overlapping of data processing tasks exists in the orchestration platform.

20 Claims, 9 Drawing Sheets

(51) Int. Cl.
    *G06F 9/54*         (2006.01)
    *G06F 13/362*     (2006.01)

(56) References Cited

U.S. PATENT DOCUMENTS

| | | | |
|---|---|---|---|
| 2018/0084016 A1* | 3/2018 | Mann | H04M 3/56 |
| 2018/0167412 A1* | 6/2018 | Barrett | H04L 63/1491 |
| 2019/0104194 A1* | 4/2019 | Imm | H04L 67/01 |
| 2019/0190798 A1 | 6/2019 | Asthana et al. | |
| 2020/0133689 A1 | 4/2020 | Ferrell et al. | |
| 2020/0351300 A1* | 11/2020 | Kaidi | H04L 63/1466 |
| 2023/0126045 A1* | 4/2023 | Pan | G06F 9/5022 |
| | | | 718/104 |

OTHER PUBLICATIONS

Mampage et al., "A Holistic View on Resource Management in Serverless Computing Environments: Taxonomy and Future Directions," arXiv:2105.11592, Jun. 1, 2021, 32 pages. https://arxiv.org/pdf/2105.11592.pdf.

Cox et al., "Serverless Inferencing on Kubernetes," arXiv:2007.07366v2, Jul. 24, 2020, 5 pages. https://arxiv.org/pdf/2007.07366.pdf.

PCT International Search Report and Written Opinion, dated Jan. 17, 2023, regarding Application No. PCT/CN2022/127279, 9 pages.

* cited by examiner

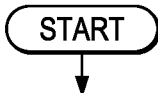

FIG. 7

START

702 — PROVIDE, BY A COMPUTER, EVENT-DRIVEN PROVISIONING OF AN ELASTIC ORCHESTRATION PLATFORM THAT INCLUDES A PRE-APPLICATION PROGRAMMING INTERFACE (API) SERVER HOOK, A CUSTOM RESOURCE DEFINITION META-CONTROLLER, A CONTROLLER META-CONTROLLER, AND A DATA PARTITION PROXY

704 — USE, BY THE COMPUTER, THE PRE-API SERVER HOOK THAT IS LOCATED IN A CONTROL PLANE IN FRONT OF AN API SERVER OF THE ELASTIC ORCHESTRATION PLATFORM TO PREPROCESS A REQUEST TO GENERATE A CUSTOM RESOURCE IN THE ELASTIC ORCHESTRATION PLATFORM TO AUTOMATE HANDLING OF THE CUSTOM RESOURCE, THE PRE-API SERVER HOOK GENERATES A CUSTOM RESOURCE DEFINITION CORRESPONDING TO THE CUSTOM RESOURCE AND THEN GENERATES THE CUSTOM RESOURCE BASED ON THE CUSTOM RESOURCE DEFINITION

706 — MONITOR, BY THE COMPUTER, USING THE CUSTOM RESOURCE DEFINITION META-CONTROLLER, FOR A CUSTOM RESOURCE DEFINITION GENERATION EVENT TO MANAGE A CUSTOM RESOURCE DEFINITION CONTROLLER CORRESPONDING TO THE CUSTOM RESOURCE DEFINITION, THE CUSTOM RESOURCE DEFINITION METACONTROLLER RETRIEVES THE CUSTOM RESOURCE DEFINITION CONTROLLER AND ITS CONFIGURATION FROM A CATALOG TO DEPLOY THE CUSTOM RESOURCE DEFINITION CONTROLLER ON A WORKER NODE IN THE ELASTIC ORCHESTRATION PLATFORM TO RUN THE CUSTOM RESOURCE ON THE WORKER NODE IN RESPONSE TO THE CUSTOM RESOURCE DEFINITION GENERATION EVENT

708 — DISTRIBUTE, BY THE COMPUTER, USING THE DATA PARTITION PROXY, DATA TO THE CUSTOM RESOURCE DEFINITION CONTROLLER RUNNING THE CUSTOM RESOURCE ON THE WORKER NODE TO ENSURE THAT NO OVERLAPPING OF DATA PROCESSING TASKS EXISTS IN THE ELASTIC ORCHESTRATION PLATFORM IN RESPONSE TO THE CONTROLLER META-CONTROLLER DEPLOYING THE CUSTOM RESOURCE DEFINITION CONTROLLER ON THE WORKER NODE

710 — DELETE, BY THE COMPUTER, USING THE CONTROLLER META-CONTROLLER, THE CUSTOM RESOURCE DEFINITION CONTROLLER IN THE WORKER NODE IN RESPONSE TO THE CUSTOM RESOURCE NO LONGER EXISTING IN THE ORCHESTRATION PLATFORM

END

EVENT-DRIVEN PROVISIONING OF AN ELASTIC ORCHESTRATION PLATFORM

BACKGROUND

1. Field

The disclosure relates generally to orchestration platforms and more specifically to automatically scaling custom resource definition controllers within an orchestration platform to keep a footprint of the orchestration platform as small as possible based on event-driven provisioning of custom resources in the orchestration platform to form an elastic orchestration platform.

2. Description of the Related Art

An orchestration platform, such as, for example, Kubernetes® (a registered trademark of the Linux Foundation of San Francisco, California), provides an architecture for automating deployment, scaling, and operations of application workloads across clusters of worker nodes. Many cloud services offer an orchestration platform as a service (e.g., Platform-as-a-Service, Infrastructure-as-a-Service, or the like).

An orchestration platform includes a controller node, which is a main controlling unit of a cluster of worker nodes (also known as host nodes, compute nodes, minions, and the like), managing the cluster's workload, and directing communication across the cluster. A worker node is a machine, either physical or virtual, where an application workload is deployed. The worker node hosts components of the application workload.

The control plane of the cluster of worker nodes, which the controller node forms, consists of various components, such as, for example, a data store, application programming interface (API) server, scheduler, controller, and the like. The data store contains configuration data of the cluster, representing the overall and desired state of the cluster at any given time. The API server provides internal and external interfaces for the controller node. The API server processes and validates resource availability requests and updates state of API objects in the data store, thereby allowing users (e.g., tenants, clients, customers, or the like) to configure application workloads across worker nodes in the cluster. The scheduler selects which worker node an unscheduled pod runs on, based on resource availability of respective worker nodes. A pod is the basic unit managed by the scheduler. The scheduler tracks resource utilization on each worker node to ensure that workload is not scheduled in excess of available resources. The controller has a reconciliation loop that drives actual cluster state toward the desired cluster state, communicating with the API server to create, update, and delete the resources the controller manages (e.g., pods, service endpoints, and the like). If the cluster's actual state doesn't match the desired state, then the controller takes action to fix the problem.

Orchestration platforms are becoming widely used. However, issues exist for cluster management in orchestration platforms. For example, user management effort for clusters in an orchestration platform is challenging. Before deploying any application workload on a cluster, the user needs to plan and provision cluster resources, deploy the cluster, deploy extension services (e.g., custom resource definitions and custom resource definition controllers) on the cluster, and the like. Even though a cloud service can assist a user in deploying the cluster in the orchestration platform, the user still needs to manually deploy all extension services and manage them on demand. Consequently, the user needs to learn and maintain these management efforts.

Further, a significant amount of computing resources is currently wasted in an orchestration platform. For example, an enterprise cluster becomes larger and larger over time with a growing footprint. Computing resources are wasted to maintain useless services in the enterprise cluster. Keeping useless services in the cluster is not cost effective for the enterprise.

SUMMARY

According to one illustrative embodiment, a computer-implemented method for provisioning an orchestration platform is provided. A computer provides event-driven provisioning of the orchestration platform that includes a pre-application programming interface (API) server hook, a custom resource definition (CRD) meta-controller, a controller meta-controller, and a data partition proxy. The computer uses the pre-API server hook, which is located in a control plane in front of an API server of the orchestration platform, to preprocess a request to generate a custom resource in the orchestration platform to automate handling of the custom resource. The pre-API server hook generates a custom resource definition corresponding to the custom resource based on information retrieved from a custom resource definition repository and generates the custom resource based on the custom resource definition. The computer, using the CRD meta-controller, monitors for a custom resource definition generation event to manage a custom resource definition controller corresponding to the custom resource definition. The CRD meta-controller retrieves the custom resource definition controller and its configuration from a CRD controller configuration repository to deploy the custom resource definition controller on a worker node in the orchestration platform to run the custom resource on the worker node in response to the custom resource definition generation event. The computer, using the data partition proxy, distributes data to the custom resource definition controller running the custom resource on the worker node to ensure that no overlapping of data processing tasks exists in the orchestration platform in response to the controller meta-controller deploying the custom resource definition controller on the worker node. According to other illustrative embodiments, a computer system and computer program product for provisioning an orchestration platform are provided. As a result, the illustrative embodiments dynamically provision the orchestration platform on demand based on custom resource definition generation events, which decrease user maintenance effort in cluster management of the orchestration platform.

The illustrative embodiments optionally detect, using the controller meta-controller, that the custom resource and the custom resource definition corresponding to the custom resource no longer exist in the API server of the orchestration platform and delete, using the controller meta-controller, the custom resource definition controller in the worker node automatically to decrease a footprint of the orchestration platform in response to detecting that the custom resource and the custom resource definition no longer exist in the API server of the orchestration platform. As a result, the illustrative embodiments keep the footprint of the orchestration platform as small as possible, which increases performance of the orchestration platform by removing unused resources, based on custom resource usage patterns.

In addition, the illustrative embodiments ensure that only currently used custom resource definition controllers remain in the orchestration platform.

BRIEF DESCRIPTION OF THE DRAWINGS

FIG. 7 is a flowchart illustrating a process for distributing data to custom resource definition controllers in accordance with an illustrative embodiment.

DETAILED DESCRIPTION

Figure 1:
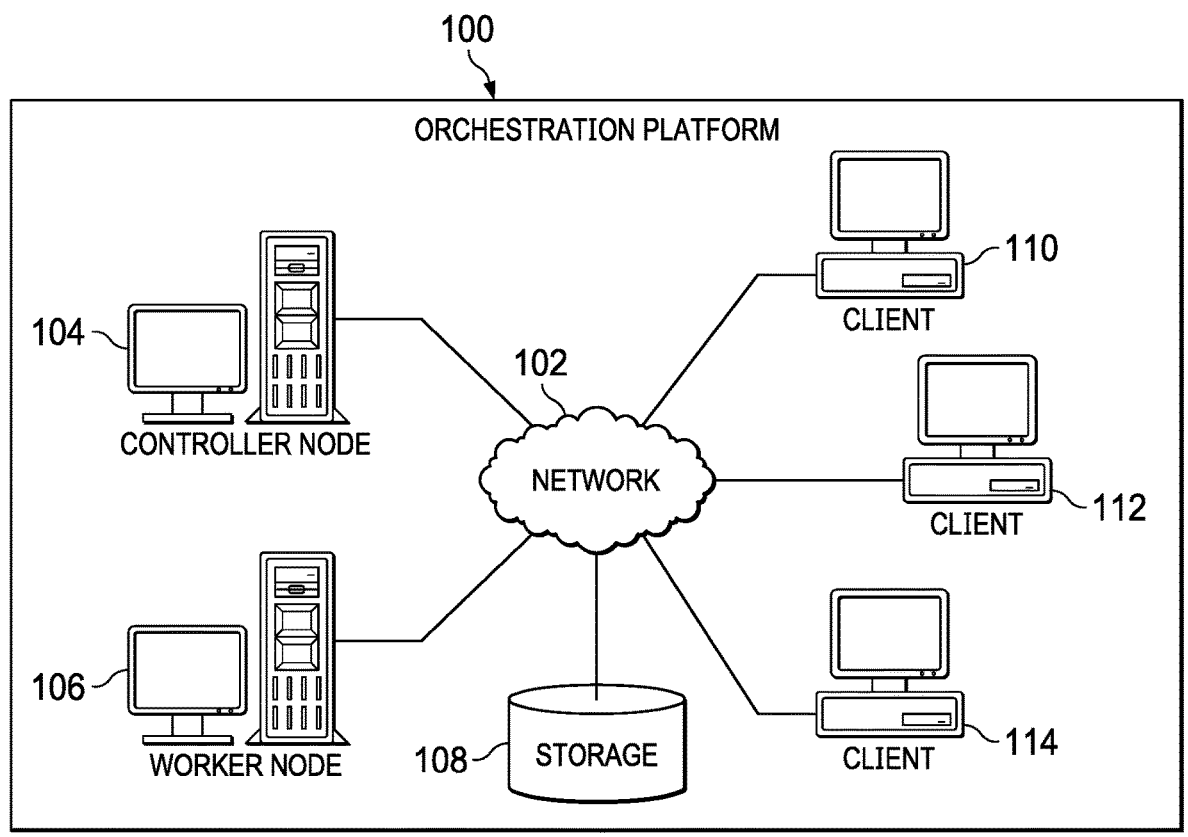
FIG. 1 is a pictorial representation of an orchestration platform in which illustrative embodiments may be implemented.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-5, diagrams of data processing environments are provided in which illustrative embodiments may be implemented. It should be appreciated that FIGS. 1-5 are only meant as examples and are not intended to assert or imply any limitation with regard to the environments in which different embodiments may be implemented. Many modifications to the depicted environments may be made.

FIG. 1 depicts a pictorial representation of an orchestration platform in which illustrative embodiments may be implemented. Orchestration platform 100 is a network of computers, data processing systems, and other devices in which the illustrative embodiments may be implemented. Orchestration platform 100 provides automatic deployment, scaling, and operations of custom resource definition controllers. Each custom resource definition controller manages and runs a custom resource that corresponds to an application workload of a service hosted by orchestration platform 100. A custom resource manages an application and the application's components. A custom resource definition defines the customer resource and the configuration of the custom resource. In other words, the custom resource definition describes or delineates what the custom resource is (e.g., a schema) and is a precondition of the custom resource.

Orchestration platform 100 may be, for example, a Kubernetes platform. However, Kubernetes is intended as an example only and not as a limitation on illustrative embodiments. In other words, illustrative embodiments may be implemented in any type of orchestration platform, infrastructure, or environment.

Orchestration platform 100 includes network 102, which is the medium used to provide communications links between the computers, data processing systems, and other devices connected together within orchestration platform 100. Network 102 may include connections, such as, for example, wire communication links, wireless communication links, fiber optic cables, and the like.

In the depicted example, orchestration platform 100 includes controller node 104 and worker node 106, along with storage 108. Controller node 104 and worker node 106 may be, for example, server computers with high-speed connections to network 102. In addition, controller node 104 and worker node 106 may each represent a cluster of server computers in one or more data centers. Alternatively, controller node 104 and worker node 106 may each represent multiple computing nodes in one or more cloud environments. Further, controller node 104 and worker node 106 may each include a set of virtual machines.

Controller node 104 receives requests to generate custom resources for performing application workloads from users, such as, for example, customers, clients, tenants, or the like. In addition, controller node 104 controls a cluster of worker nodes, which is represented by worker node 106, that performs the application workloads corresponding to services hosted by orchestration platform 100.

Client 110, client 112, and client 114 also connect to network 102. Clients 110, 112, and 114 are clients of controller node 104 and worker node 106. In this example, clients 110, 112, and 114 are shown as desktop or personal computers with wire communication links to network 102. However, it should be noted that clients 110, 112, and 114 are examples only and may represent other types of data processing systems, such as, for example, network computers, laptop computers, handheld computers, smart phones, smart televisions, and the like, with wire or wireless communication links to network 102.

Users of clients 110, 112, and 114 may utilize clients 110, 112, and 114 to submit custom resource generation requests for performing application workloads corresponding to the set of services hosted by orchestration platform 100. An application workload may be any type of workload, such as, for example, data processing, image processing, transaction processing, sensor monitoring, scientific calculations, forecasts, predictions, or the like. It should be noted that client device users may also include, for example, administrators of orchestration platform 100, application owners that provide the applications for the set of services hosted by orchestration platform 100, and the like.

Storage 108 is a network storage device capable of storing any type of data in a structured format or an unstructured format. In addition, storage 108 may represent a plurality of network storage devices. Further, storage 108 may store identifiers and network addresses for a plurality of server computers, identifiers and network addresses for a plurality of client devices, identifiers for a plurality of client device users, a plurality of different custom resource definitions, configuration information for a plurality of different custom resource definition controllers that correspond to the custom resource definitions, and the like. Furthermore, storage 108 may store other types of data, such as authentication or credential data that may include usernames, passwords, and the like associated with orchestration platform administrators and client device users, for example.

In addition, it should be noted that orchestration platform 100 may include any number of additional controller nodes, worker nodes, client devices, storage devices, and other devices not shown. Program code located in orchestration platform 100 may be stored on a computer-readable storage medium or a set of computer-readable storage media and downloaded to a computer or other data processing device for use. For example, program code may be stored on a computer-readable storage medium on controller node 104 and downloaded to worker node 106 over network 102 for use on worker node 106.

In the depicted example, orchestration platform 100 may be implemented as a number of different types of communication networks, such as, for example, an internet, an intranet, a wide area network, a local area network, a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Figure 2:
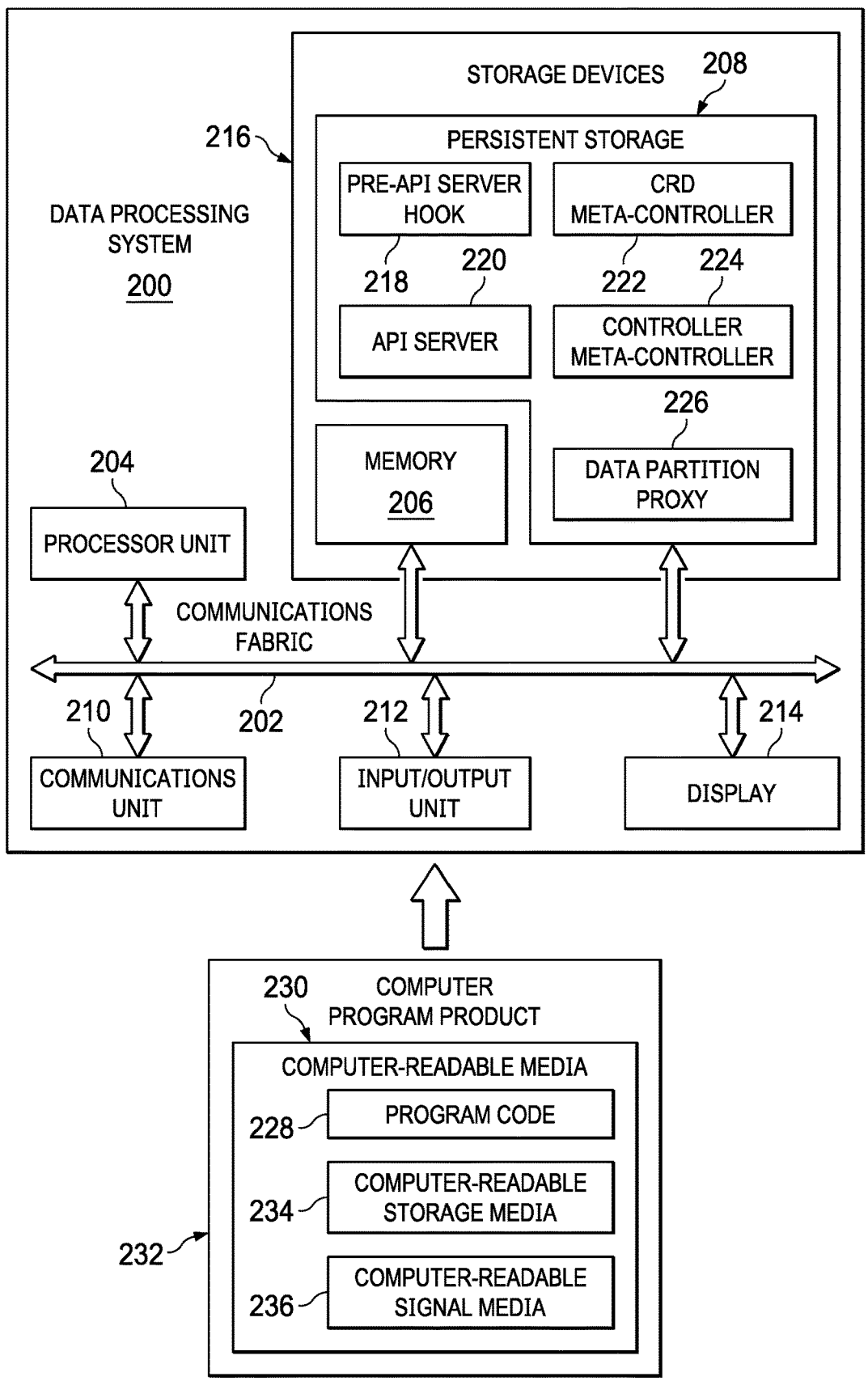
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as controller node 104 in FIG. 1, in which computer-readable program code or instructions implementing the custom resource definition controller management processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer-readable storage device or a computer-readable storage medium is any piece of hardware that is capable of storing information, such as, for example, without limitation, data, computer-readable program code in functional form, and/or other suitable information either on a transient basis or a persistent basis. Further, a computer-readable storage device or a computer-readable storage medium excludes a propagation medium, such as transitory signals. Furthermore, a computer-readable storage device or a computer-readable storage medium may represent a set of computer-readable storage devices or a set of computer-readable storage media. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores pre-application programming interface (API) server hook 218. However, it should be noted that even though pre-API server hook 218 is illustrated as residing in persistent storage 208, in an alternative illustrative embodiment, pre-API server hook 218 may be a separate component of data processing system 200. For example, pre-API server hook 218 may be a hardware component coupled to communication fabric 202 or a combination of hardware and software components.

Pre-API server hook 218 is located in a control plane of data processing system 200 in front of API server 220. In other words, pre-API server hook 218 intercepts and pre-processes requests from client device users to generate custom resources for performing application workloads on a cluster of worker nodes. In response to receiving a custom resource generation request, pre-API server hook 218 generates a custom resource definition corresponding to the requested custom resource based on information retrieved from a custom resource definition repository coupled to pre-API server hook 218. After generating the custom resource definition, pre-API server hook 218 then generates the requested custom resource based on the custom resource definition. Pre-API server hook 218 sends the newly generated custom resource definition and custom resource to API server 220. While the term API server is generally used in the Kubernetes paradigm, the term as used herein is not limited to that environment but rather refers to any type of component that can provide both internal and external interfaces for an orchestration platform and deploy custom resources on worker nodes for performing application workloads corresponding to services hosted by the orchestration platform. The orchestration platform may be, for example, orchestration platform 100 in FIG. 1.

In this example, API server 220, CRD meta-controller 222, controller meta-controller 224, and data partition proxy 226 are shown as separate components. However, in an alternative illustrative embodiment, one or more components may be combined into one component. For example, CRD meta-controller 222, controller meta-controller 224, and data partition proxy 226 may be components of API server 220.

API server 220 utilizes custom resource definition (CRD) meta-controller 222 to automatically generate a custom resource definition controller, which corresponds to the newly generated custom resource definition, based on information retrieved from a CRD controller configuration repository coupled to CRD meta-controller 222. CRD meta-controller 222 monitors for custom resource definition generation events. The custom resource definition controller runs the custom resource that API server 220 deployed on a worker node of the orchestration platform.

API server 220 utilizes controller meta-controller 224 to automatically deploy the newly generated custom resource definition controller on a worker node of the orchestration platform. In addition, API server 220 utilizes controller meta-controller 224 to automatically destroy or delete the custom resource definition controller deployed on the worker node in response to detecting that the custom resource and its custom resource definition no longer exist on API server 220. As a result, controller meta-controller 224 keeps the footprint of the orchestration platform as small as possible, which increases performance of the orchestration platform by removing unused resources.

API server 220 utilizes data partition proxy 226 to distribute data to the deployed custom resource definition controller. Data partition proxy 226 utilizes a defined distribution algorithm to partition incoming data between custom resource definition controllers based on scaling up and scaling down of the number of custom resource definition controllers on worker nodes by controller meta-controller 224 to prevent overlap of data processing tasks in the orchestration platform.

As a result, data processing system 200 operates as a special purpose computer system in which pre-API server hook 218, API server 220, CRD meta-controller 222, controller meta-controller 224, and data partition proxy 226 in data processing system 200 enable deployment and management of custom resource definition controllers on worker nodes to run corresponding custom resources for performing application workloads of services on the worker nodes. In particular, pre-API server hook 218, API server 220, CRD meta-controller 222, controller meta-controller 224, and data partition proxy 226 transform data processing system 200 into a special purpose computer system as compared to currently available general computer systems that do not have pre-API server hook 218, API server 220, CRD meta-controller 222, controller meta-controller 224, and data partition proxy 226.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer-readable program code that may be read and run by a processor in processor unit 204. The program instructions, in the different embodiments, may be embodied on different physical computer-readable storage devices, such as memory 206 or persistent storage 208.

Program code 228 is located in a functional form on computer-readable media 230 that is selectively removable and may be loaded onto or transferred to data processing system 200 for running by processor unit 204. Program code 228 and computer-readable media 230 form computer program product 232. In one example, computer-readable media 230 may be computer-readable storage media 234 or computer-readable signal media 236.

In these illustrative examples, computer-readable storage media 234 is a physical or tangible storage device used to store program code 228 rather than a medium that propagates or transmits program code 228. Computer-readable storage media 234 may include, for example, an optical or magnetic disc that is inserted or placed into a drive or other device that is part of persistent storage 208 for transfer onto a storage device, such as a hard drive, that is part of persistent storage 208. Computer-readable storage media 234 also may take the form of a persistent storage, such as a hard drive, a thumb drive, or a flash memory that is connected to data processing system 200.

Alternatively, program code 228 may be transferred to data processing system 200 using computer-readable signal media 236. Computer-readable signal media 236 may be, for example, a propagated data signal containing program code 228. For example, computer-readable signal media 236 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer-readable media 230" can be singular or plural. For example, program code 228 can be located in computer-readable media 230 in the form of a single storage device or system. In another example, program code 228 can be located in computer-readable media 230 that is distributed in multiple data processing systems. In other words, some instructions in program code 228 can be located in one data processing system while other instructions in program code 228 can be located in one or more other data processing systems. For example, a portion of program code 228 can be located in computer-readable media 230 in a server computer while another portion of program code 228 can be located in computer-readable media 230 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 228.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

Currently, orchestration platform services have a heavy footprint, as orchestration platform services include a multitude of components and some of these components do not run all the time. In order to reduce the footprint of these orchestration platform services, a solution is needed to dynamically scale up and scale down orchestration platform services based on application workloads. No solution currently exists to keep the footprint of an orchestration platform cluster as small as possible. In addition, no solution currently exists to dynamically provision an orchestration platform on demand based on custom resource definition generation events, which would decrease user maintenance effort in cluster management of the orchestration platform.

Illustrative embodiments provide a custom resource definition event-driven provisioning process to enable an elastic orchestration platform. Illustrative embodiments start with a custom resource definition-less orchestration platform prior to deployment. In other words, the orchestration platform does not initially include any custom resource definitions. Illustrative embodiments utilize a pre-API server hook to monitor for requests from users to generate custom resources in the orchestration platform and then generate custom resource definitions corresponding to the user-requested custom resources on demand. Illustrative embodiments also utilize the pre-API server hook to generate the custom resources using corresponding custom resource definitions. The pre-API server hook is located in a control plane of the orchestration platform in front of an API server of a controller node within the orchestration platform. The pre-API server hook preprocesses user custom resource generation requests to automate custom resource handling in generation of custom resource definitions and the requested custom resources in correct order.

Further, illustrative embodiments start with a custom resource definition controller-less orchestration platform prior to deployment. In other words, the orchestration platform does not initially include any custom resource definition controllers. Illustrative embodiments utilize a CRD meta-controller to monitor for a newly generated custom resource definition and then automatically generate a custom resource definition controller corresponding to the newly generated custom resource definition on demand. The CRD meta-controller monitors for custom resource definition generation events and manages the custom resource definition controllers. For example, if the pre-API server hook generates a new custom resource definition for a user-requested custom resource, then the CRD meta-controller retrieves a corresponding custom resource definition controller and its configuration from a CRD controller configuration repository in a catalog to run the user-requested custom resource, which corresponds to the newly generated custom resource definition.

Moreover, the CRD meta-controller generates and manages a controller meta-controller to scale, both up and down, a number of custom resource definition controllers in the orchestration platform based on demand. For example, when a particular custom resource and its corresponding custom resource definition no longer exist in the orchestration platform, then the controller meta-controller deletes the corresponding custom resource definition controller form the orchestration platform. Thus, illustrative embodiments ensure that only currently used custom resource definition controllers remain in the orchestration platform.

Furthermore, illustrative embodiments utilize a data partition proxy for scaling of custom resource definition controllers. For example, the data partition proxy transparently performs data distribution to custom resource definition controllers as the controller meta-controller of illustrative embodiments scales up and scales down the number of custom resource definition controllers. It should be noted that the controller meta-controller generates and manages the data partition proxy. When the controller meta-controller scales up the number of custom resource definition controllers in a cluster of worker nodes, the data partition proxy divides custom resources to different corresponding custom resource definition controllers to ensure that no overlap of data processing tasks exists in the orchestration platform.

Illustrative embodiments start with a basic orchestration platform and then add the pre-API server hook and the CRD meta-controller. The pre-API server hook preprocess user custom resource generation requests to automate custom resource handling. The CRD meta-controller monitors for custom resource definition events (e.g., when a user requests generation of a custom resource) to manage custom resource definitions and their corresponding custom resource definition controllers. Illustrative embodiments also utilize a CRD controller configuration repository and a custom resource definition repository. The CRD controller configuration repository stores default configurations for a plurality of custom resource definition controllers, which correspond to custom resource definitions. The custom resource definition repository stores a plurality of different custom resource definitions.

Illustrative embodiments are capable of keeping the footprint of the orchestration platform as small as possible based on custom resource usage patterns. Furthermore, illustrative embodiments enable decreased maintenance of the orchestration platform by automatically managing custom resource definitions and their corresponding custom resource definition controllers, along with related dependencies. Illustrative embodiments can automatically scale the orchestration platform without user management effort. For example, illustrative embodiments can transparently and effectively perform custom resource handling for automatic custom resource definition controller scale up and scale down within the orchestration platform.

Thus, illustrative embodiments provide an elastic orchestration platform deployment using a pre-API server hook, CRD meta-controller, controller meta-controller, and data partition proxy to automatically scale custom resource definition controllers corresponding to custom resource definitions of custom resources in a transparent way. The data partition proxy utilizes a distribution algorithm to perform the custom resource data partitioning to make each custom resource definition controller handle a separate custom resource for improved balance without data processing overlap.

Consequently, illustrative embodiments provide one or more technical solutions that overcome a technical problem with keeping the footprint of an orchestration platform as small as possible, while decreasing user management effort. As a result, these one or more technical solutions provide a technical effect and practical application in the field of orchestration platform management.

Figure 3:
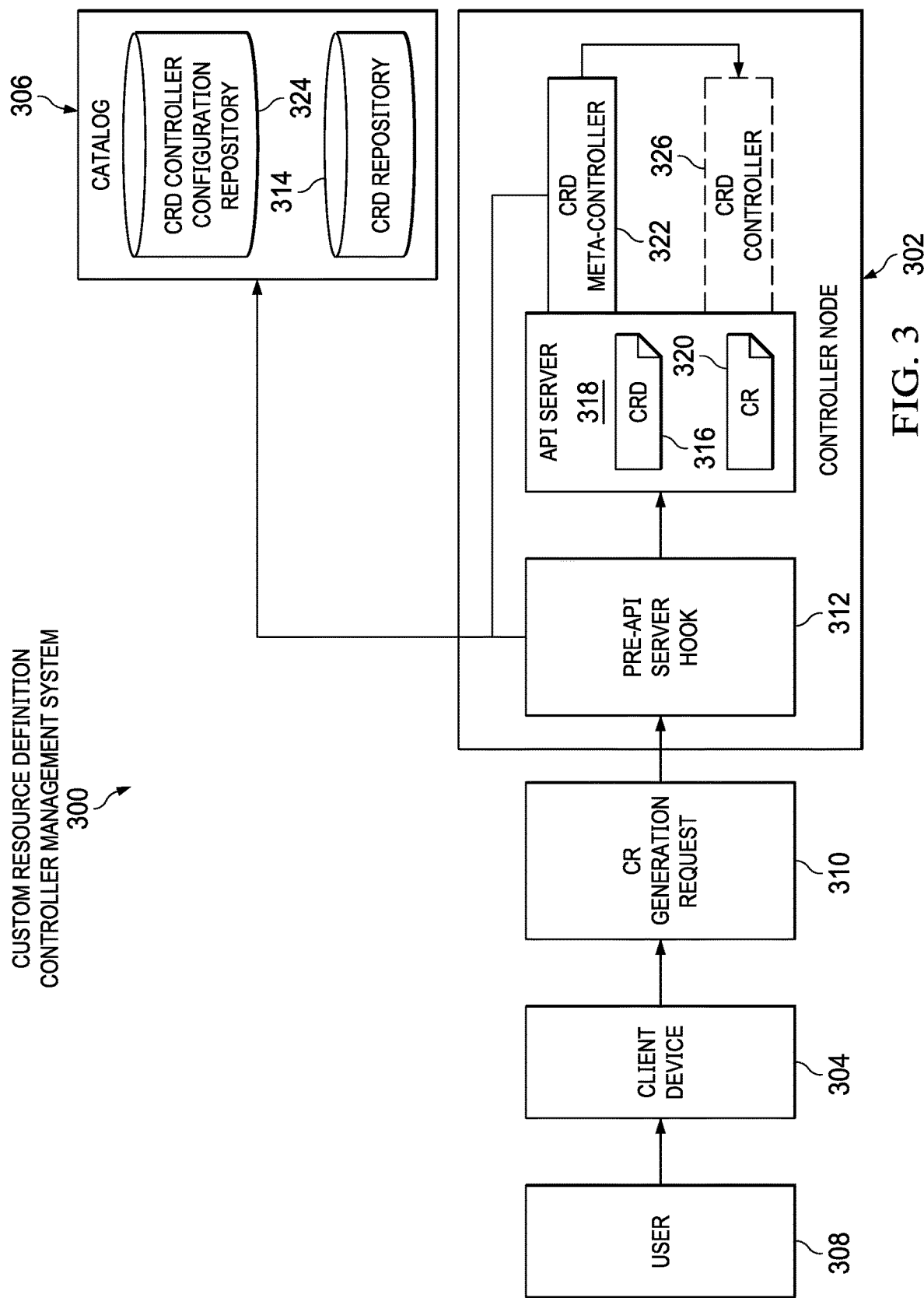
FIG. 3 is a diagram illustrating an example of a custom resource definition controller management system in accordance with an illustrative embodiment.

With reference now to FIG. 3, a diagram illustrating an example a custom resource definition controller management system is depicted in accordance with an illustrative embodiment. Custom resource definition controller management system 300 may be implemented in an orchestration platform, such as, for example, orchestration platform 100 in FIG. 1. Custom resource definition controller management system 300 is a system of hardware and software components for generating custom resource definition controllers.

In this example, custom resource definition controller management system 300 includes controller node 302, client device 304, and catalog 306. Controller node 302 may be, for example, controller node 104 in FIG. 1 or data processing system 200 in FIG. 2. Client device 304 may be, for example, client 110 in FIG. 1. Catalog 306 may be, for example, storage 108 in FIG. 1.

It should be noted that the orchestration platform, which implements custom resource definition controller management system 300, starts with no (e.g., zero) custom resource definitions and no custom resource definition controllers. First, user 308 utilizing client device 304 submits custom resource (CR) generation request 310 (e.g., a request to generate a custom resource in the orchestration platform) to pre-API server hook 312 to trigger the custom resource automation process of illustrative embodiments. Pre-API server hook 312 may be, for example, pre-API server hook 218 in FIG. 2. In response to receiving custom resource generation request 310 from user 308 via client device 304, pre-API server hook 312 retrieves a custom resource definition corresponding to the user-requested custom resource from custom resource definition repository 314 in catalog 306.

Pre-API server hook 312 generates custom resource definition 316 in API server 318 of controller node 302 based on the custom resource definition, which corresponds to the user-requested custom resource, retrieved from custom resource definition repository 314. API server 318 may be, for example, API server 220 in FIG. 2. In addition, pre-API server hook 312 generates custom resource 320 in API server 318 based on custom resource definition 316.

Further, API server 318 utilizes CRD meta-controller 322 to retrieve a configuration of a custom resource definition controller, which corresponds to custom resource definition 316, from CRD controller configuration repository 324 in catalog 306. CRD meta-controller 322 may be, for example, CRD meta-controller 222 in FIG. 2. CRD meta-controller 322 generates custom resource definition controller 326 based on the configuration information retrieved from CRD controller configuration repository 324.

API server 318 utilizes a controller meta-controller, such as, for example, controller meta-controller 224 in FIG. 2, to deploy custom resource definition controller 326 on a worker node of a cluster in the orchestration platform. Furthermore, the controller meta-controller automatically destroys or deletes custom resource definition controller 326 on the worker node when custom resource 329 and custom resource definition 316, which correspond to custom resource definition controller 326, no longer exist in API server 318.

Figure 4:
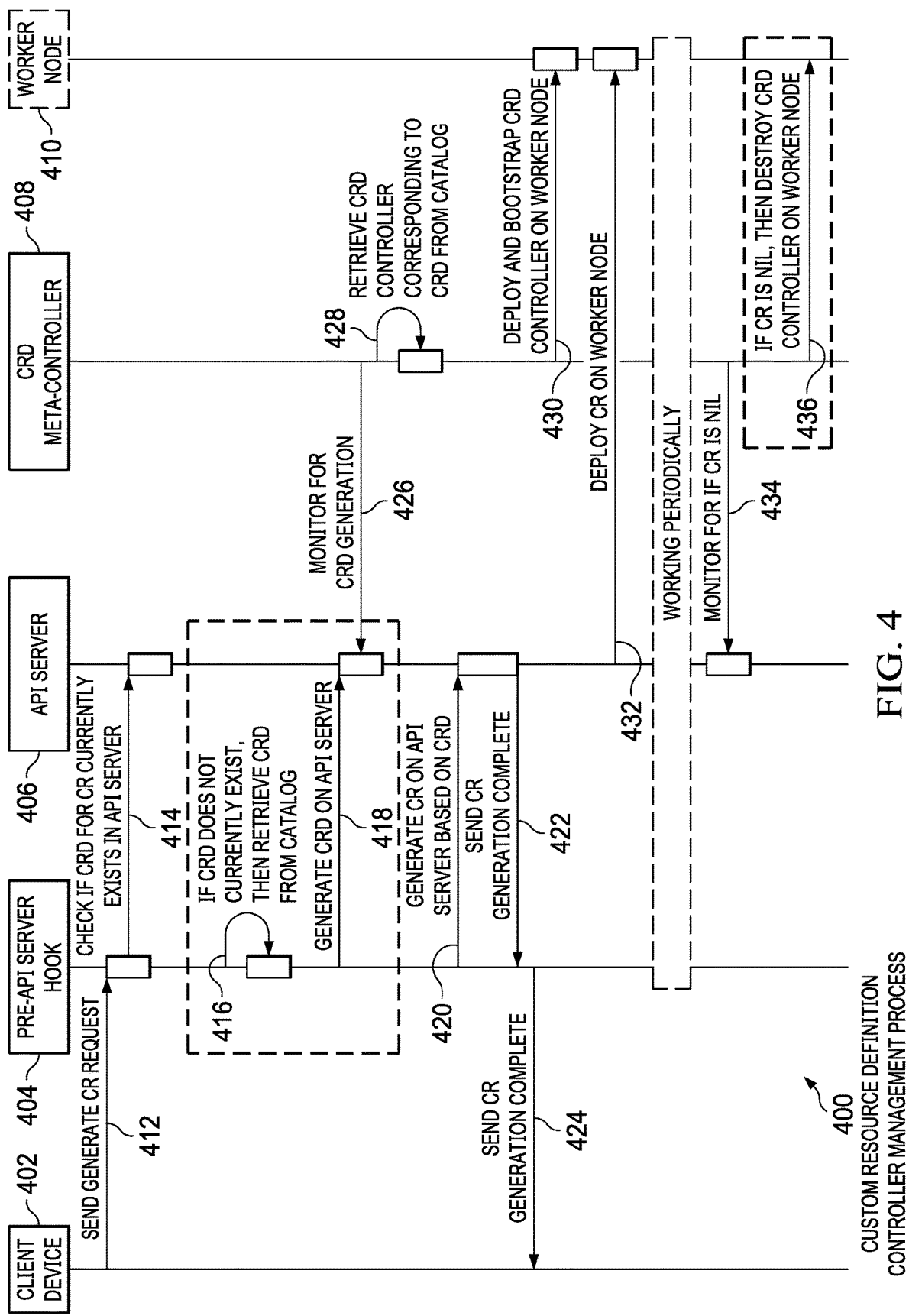
FIG. 4 is a diagram illustrating an example of a custom resource definition controller management process in accordance with an illustrative embodiment.

With reference now to FIG. 4, a diagram illustrating an example of a custom resource definition controller management process is depicted in accordance with an illustrative embodiment. Custom resource definition controller management process 400 may be implemented in an orchestration platform, such as, for example, orchestration platform 100 in FIG. 1, or custom resource definition controller management system, such as, for example, custom resource definition controller management system 300 in FIG. 3.

In this example, custom resource definition controller management process 400 includes client device 402, pre-API server hook 404, API server 406, CRD meta-controller 408, and worker node 410. Client device 402, pre-API server hook 404, API server 406, and CRD meta-controller 408 may be, for example, client device 304, pre-API server hook 312, API server 318, and CRD meta-controller 322 in FIG. 3. Worker node 410 may be, for example, worker node 106 in FIG. 1.

At 412, client device 402 sends a request to generate a custom resource, such as, for example, custom resource generation request 310 in FIG. 3, to pre-API server hook 404. At 414, pre-API server hook 404 checks if a custom resource definition for the custom resource currently exists in API server 406. At 416, if the custom resource definition does not currently exist in API server 406, then pre-API server hook 404 retrieves the custom resource definition from a custom resource definition repository of a catalog, such as, for example, custom resource definition repository 314 of catalog 306 in FIG. 3.

At 418, pre-API server hook 404 generates the custom resource definition, such as, for example, custom resource definition 316 in FIG. 3, on API server 406. In addition, at 420, pre-API server hook 404 generates the custom resource, such as, for example, custom resource 320 in FIG. 3, on API server 406 based on the generated custom resource definition. At 422, API server 406 sends a custom resource generation complete notification to pre-API server hook 404. At 424, pre-API server hook 404 then sends the custom resource generation complete notification to client device 402.

At 426, CRD meta-controller 408 monitors for generation of the custom resource definition. At 428, in response to detecting generation of the custom resource definition, CRD meta-controller 408 retrieves a custom resource controller, such as, for example, custom resource definition controller 326 in FIG. 3, which corresponds to the generated custom resource definition, from a CRD controller configuration repository of the catalog, such as, for example, CRD controller configuration repository 324 in FIG. 3. At 430, CRD meta-controller 408 utilizes a controller meta-controller, such as, for example, controller meta-controller 224 in FIG. 2, to deploy and bootstrap the custom resource definition controller on a worker node, such as, for example, worker node 106 in FIG. 1.

At 432, in response to the controller meta-controller deploying the custom resource definition controller on the worker node, API server 406 deploys the custom resource on the worker node. At 434, CRD meta-controller 408 monitors if the custom resource is nil (e.g., does not exist) on API server 406. At 436, in response to determining that the custom resource is nil, CRD meta-controller 408 instructs the controller meta-controller to destroy the custom resource definition controller on the worker node.

Figure 5:
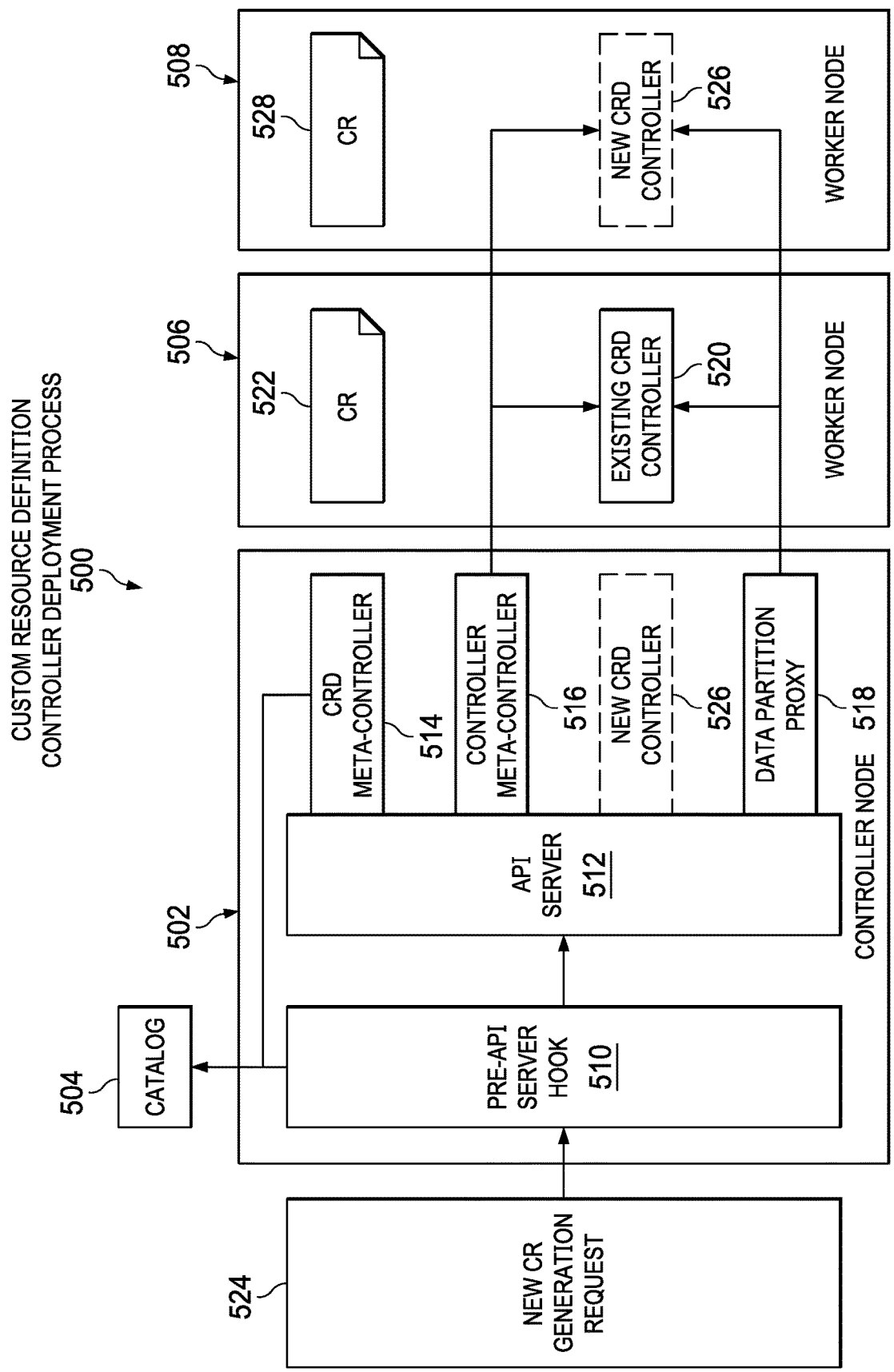
FIG. 5 is a diagram illustrating an example of a custom resource definition controller deployment process in accordance with an illustrative embodiment.

With reference now to FIG. 5, a diagram illustrating an example of a custom resource definition controller deployment process is depicted in accordance with an illustrative embodiment. Custom resource definition controller deployment process 500 may be implemented in an orchestration platform, such as, for example, orchestration platform 100 in FIG. 1.

In this example, custom resource definition controller deployment process 500 includes controller node 502, catalog 504, worker node 506, and worker node 508. Controller node 502 includes pre-API server hook 510, API server 512, CRD meta-controller 514, controller meta-controller 516, and data partition proxy 518. Worker node 506 includes existing custom resource definition controller 520 to run custom resource 522. Controller meta-controller 516 previously deployed existing custom resource definition controller 520 on worker node 506 in response to a previous request to generate custom resource 522.

Now, pre-API server hook 510 receives new custom resource generation request 524. Pre-API server hook 510 generates a custom resource definition for the newly requested custom resource using information retrieved from a custom resource definition repository in catalog 504. In addition, pre-API server hook 510 generates the newly requested custom resource using the newly generated custom resource definition. Further, CRD meta-controller 514 generates new custom resource definition controller 526, which corresponds to the newly generated custom resource definition, using information retrieved from a CRD controller configuration repository, such as, for example, CRD controller configuration repository 324 in FIG. 3, contained in catalog 504.

Controller meta-controller 516 deploys new custom resource definition controller 526 on worker node 508 based on a predefined custom resource utilization policy. The predefined custom resource utilization policy may be based on, for example, best practices of an enterprise utilizing the orchestration platform to run an application workload of a service corresponding to the enterprise. Further, API server 512 deploys the newly generated custom resource (custom resource 528) on worker node 508.

Furthermore, controller meta-controller 516 scales down or deletes a custom resource definition controller from the orchestration platform when the custom resource and its corresponding custom resource definition no longer exist in the orchestration platform. Moreover, controller meta-controller 516 manages data partition proxy 518 to distribute data corresponding to the service from API server 512 to existing custom resource definition controller 520 on worker node 506 and new custom resource definition controller 526 on worker node 508 without overlap.

Figure 6:
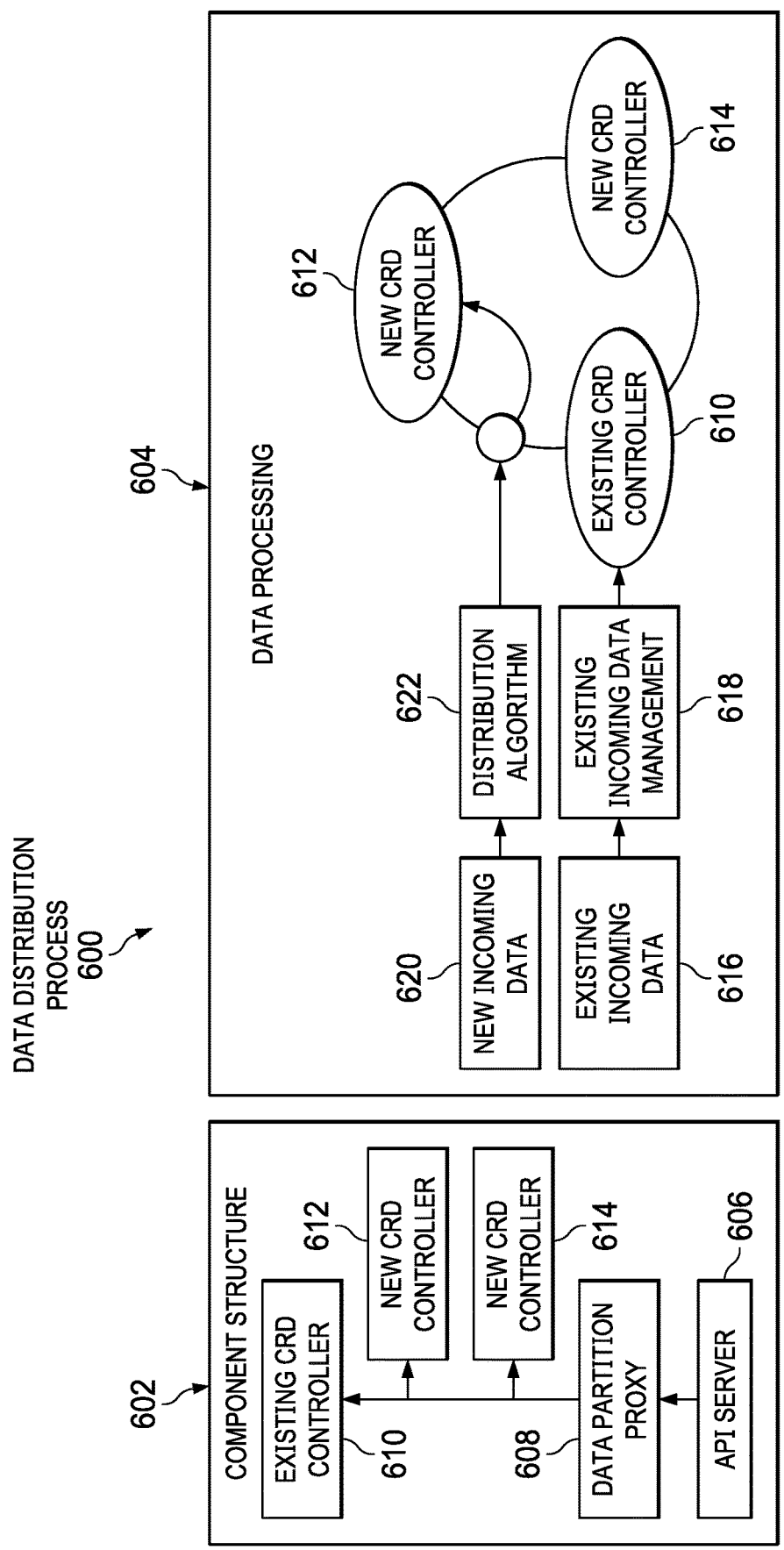
FIG. 6 is a diagram illustrating an example of a data distribution process in accordance with an illustrative embodiment.

With reference now to FIG. 6, a diagram illustrating an example of a data distribution process is depicted in accordance with an illustrative embodiment. Data distribution process 600 may be implemented in an orchestration platform, such as, for example, orchestration platform 100 in FIG. 1.

In this example, data distribution process 600 includes component structure 602 and data processing 604. Component structure 602 is comprised of API server 606, data partition proxy 608, existing custom resource definition controller 610, new custom resource definition controller 612, and new custom resource definition controller 614. Data partition proxy 608 distributes data from API server 606 to each of existing custom resource definition controller 610, new custom resource definition controller 612, and new custom resource definition controller 614 without overlap. In other words, data partition proxy 608 takes over communication from API server 606 to distribute data to deployed custom resource definition controllers on worker nodes in a cluster, such as, for example, worker node 506 and worker node 508 in FIG. 5.

In response to a controller meta-controller, such as, for example, controller meta-controller 516 in FIG. 5, scales up the number of custom resource definition controllers, such as new custom resource definition controller 612 and new custom resource definition controller 614, on worker nodes, data partition proxy 608 does not redistribute existing incoming data to a new custom resource definition controller, but instead continues to distribute the existing incoming data to an existing custom resource definition controller, which is already handling the existing incoming data. For example, in data processing 604, which includes existing custom resource definition controller 610, new custom resource definition controller 612, and new custom resource definition controller 614, data partition proxy 608 distributes existing incoming data 616 to existing custom resource definition controller 610 using existing incoming data management 618. As a result, any custom resource handling by an existing custom resource definition controller will not have a race condition exist.

In addition, data partition proxy 608 distributes new incoming data 620 to new custom resource definition controller 612 using distribution algorithm 622 as existing custom resource definition controller 610 is already handling existing incoming data 616. Data partition proxy 608 balances the load to the other newly generated custom resource definition controllers, such as new custom resource definition controller 614, as needed. When the controller meta-controller scales down or deletes a custom resource definition controller, data partition proxy 608 redistributes the data from the deleted custom resource definition controller to other custom resource definition controllers in the cluster.

With reference now to FIG. 7, a flowchart illustrating a process for distributing data to custom resource definition controllers is shown in accordance with an illustrative embodiment. The process shown in FIG. 7 may be implemented in a computer, such as, for example, controller node 104 in FIG. 1 or data processing system 200 in FIG. 2.

The process begins when the computer provides event-driven provisioning of an elastic orchestration platform that includes a pre-API server hook, a CRD meta-controller, a controller meta-controller, and a data partition proxy (step 702). The computer uses the pre-API server hook, which is located in a control plane in front of an API server of the elastic orchestration platform, to preprocess a request to generate a custom resource in the elastic orchestration platform to automate handling of the custom resource (step 704). The pre-API server hook generates a custom resource definition corresponding to the custom resource based on information retrieved by the pre-API server hook from a custom resource definition repository. Afterward, the pre-API server hook generates the custom resource based on the custom resource definition.

The computer, using the CRD meta-controller, monitors for a custom resource definition generation event to manage a custom resource definition controller corresponding to the custom resource definition (step 706). The CRD meta-controller retrieves the custom resource definition controller and its configuration from a CRD controller configuration repository of a catalog to deploy the custom resource definition controller on a worker node in the elastic orchestration platform to run the custom resource on the worker node in response to the custom resource definition generation event.

In addition, the computer, using the data partition proxy, distributes data to the custom resource definition controller running the custom resource on the worker node to ensure that no overlapping of data processing tasks exists in the elastic orchestration platform in response to the controller meta-controller deploying the custom resource definition controller on the worker node (step 708). Further, the computer, using the controller meta-controller, deletes the custom resource definition controller in the worker node in response to the custom resource no longer existing in the elastic orchestration platform (step 710). Thereafter, the process terminates.

Figure 8A:
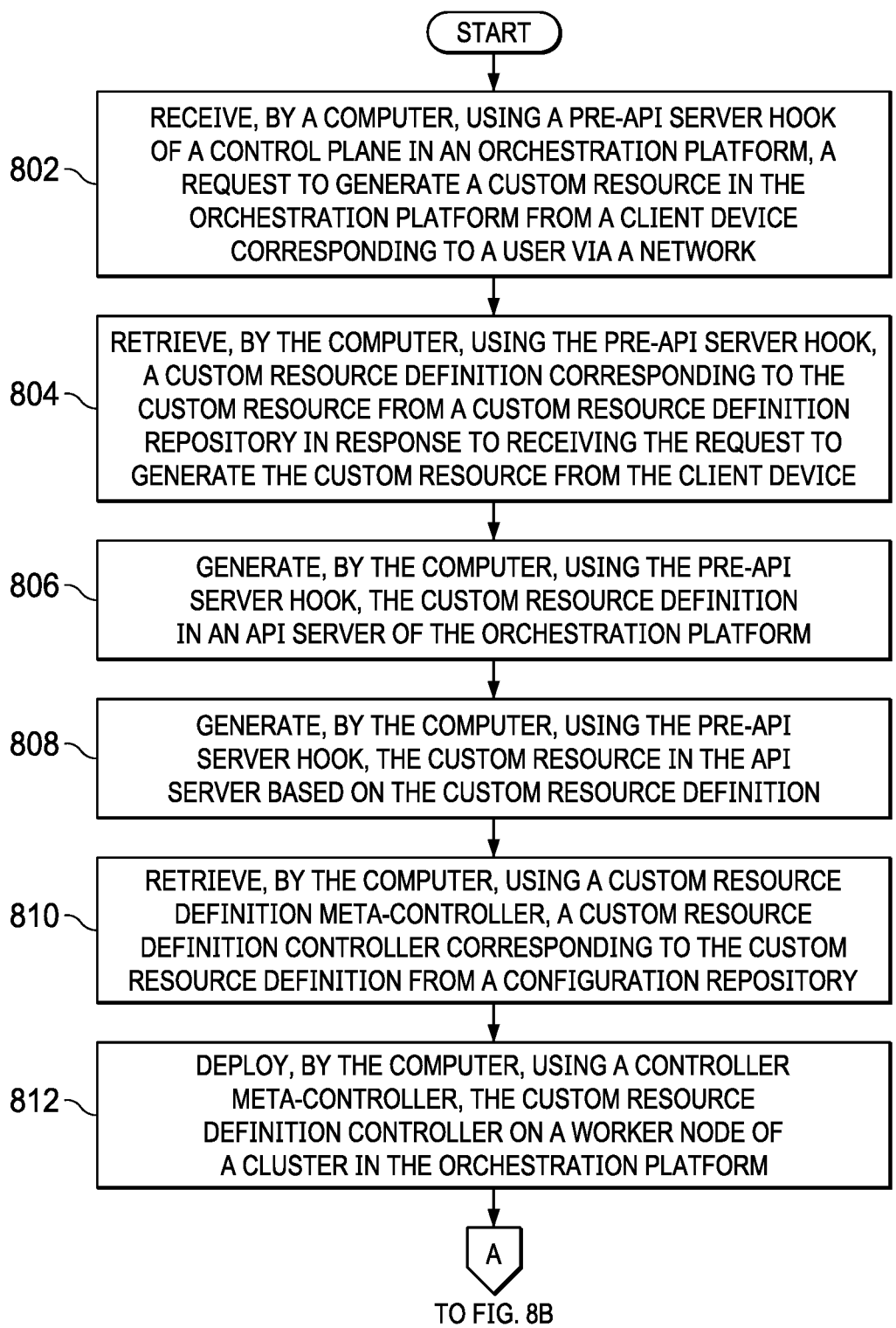
FIGS. 8A-8B are a flowchart illustrating a process for scaling custom resource definition controllers in accordance with an illustrative embodiment.
Figure 8B:
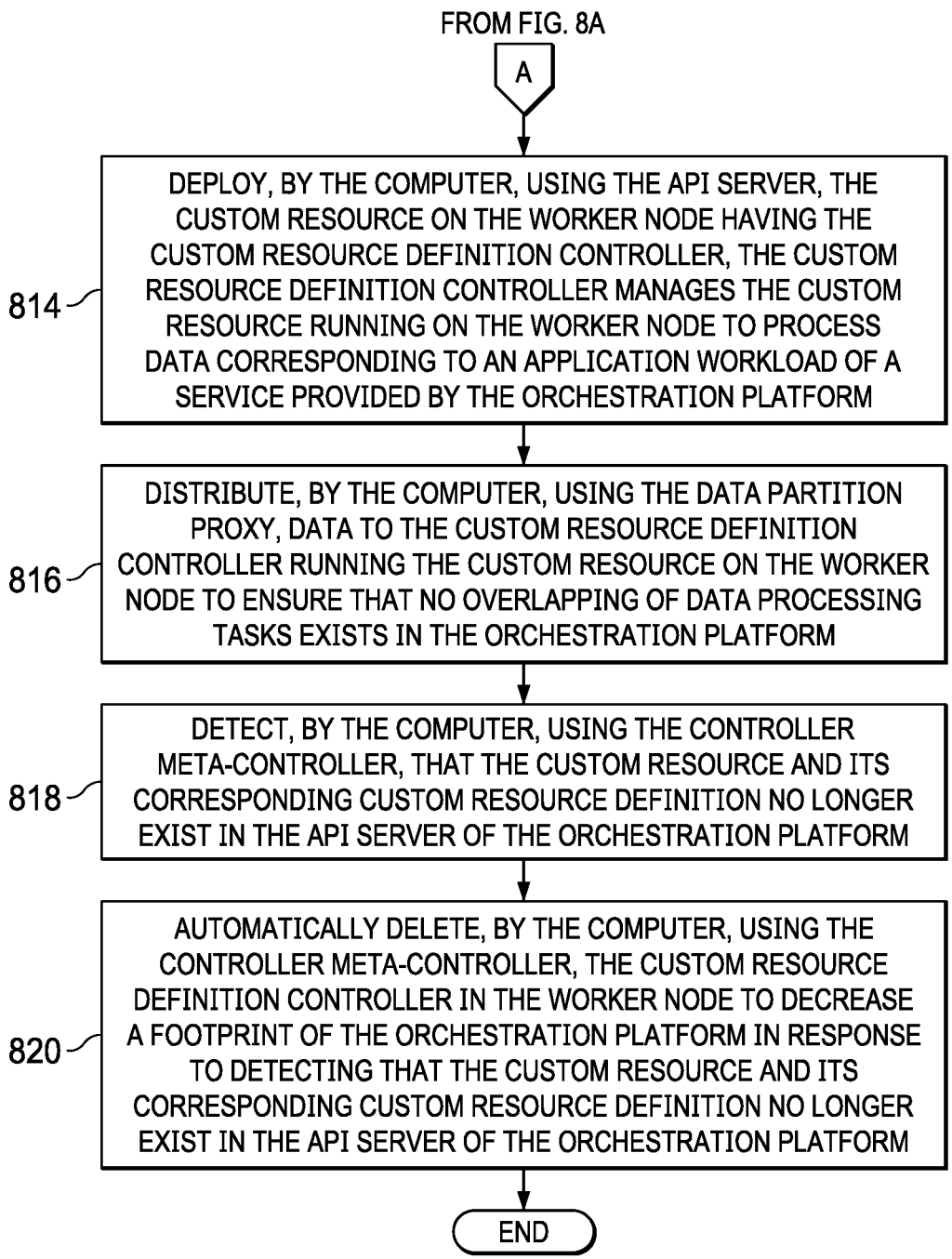

With reference now to FIGS. 8A-8B, a flowchart illustrating a process for scaling custom resource definition controllers is shown in accordance with an illustrative embodiment. The process shown in FIGS. 8A-8B may be implemented in a computer, such as, for example, controller node 104 in FIG. 1 or data processing system 200 in FIG. 2.

The process begins when the computer, using a pre-API server hook of a control plane in an orchestration platform, receives a request to generate a custom resource in the orchestration platform from a client device corresponding to a user via a network (step 802). The computer, using the pre-API server hook, retrieves a custom resource definition corresponding to the custom resource from a custom resource definition repository in response to receiving the request to generate the custom resource from the client device (step 804).

The computer, using the pre-API server hook, generates the custom resource definition in an API server of the orchestration platform (step 806). In addition, the computer, using the pre-API server hook, generates the custom resource in the API server based on the custom resource definition (step 808).

The computer, using a custom resource definition meta-controller, retrieves a custom resource definition controller corresponding to the custom resource definition from a CRD controller configuration repository (step 810). The computer, using a controller meta-controller, deploys the custom resource definition controller on a worker node of a cluster in the orchestration platform (step 812). Further, the computer, using the API server, deploys the custom resource on the worker node having the custom resource definition controller (step 814). The custom resource definition controller manages the custom resource running on the worker node to process data corresponding to an application workload of a service provided by the orchestration platform.

The computer, using the data partition proxy, distributes data to the custom resource definition controller running the custom resource on the worker node to ensure that no overlapping of data processing tasks exists in the orchestration platform (step 816). Furthermore, the computer, using the controller meta-controller, detects that the custom resource and its corresponding custom resource definition no longer exist in the API server of the orchestration platform (step 818). The computer, using the controller meta-controller, automatically deletes the custom resource definition controller in the worker node to decrease a footprint of the orchestration platform in response to detecting that the custom resource and its corresponding custom resource definition no longer exist in the API server of the orchestration platform (step 820). Thereafter, the process terminates.

Thus, illustrative embodiments of the present invention provide a computer-implemented method, computer system, and computer program product for scaling custom resource definition controllers within an orchestration platform to keep a footprint of the orchestration platform as small as possible based on event-driven provisioning of custom resources in the orchestration platform. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for provisioning an orchestration platform, the computer-implemented method comprising:
   providing, by a computer, event-driven provisioning of the orchestration platform that includes a pre-application programming interface (API) server hook, a custom resource definition (CRD) meta-controller, a controller meta-controller, and a data partition proxy;
   using, by the computer, the pre-API server hook, which is located in a control plane in front of an API server of the orchestration platform, to preprocess a request to generate a custom resource in the orchestration platform to automate handling of the custom resource, the pre-API server hook generates a custom resource definition corresponding to the custom resource based on information retrieved from a custom resource definition repository and generates the custom resource based on the custom resource definition;
   monitoring, by the computer, using the CRD meta-controller, for a custom resource definition generation event to manage a custom resource definition controller corresponding to the custom resource definition, the CRD meta-controller retrieves the custom resource definition controller and its configuration from a CRD controller configuration repository to deploy the custom resource definition controller on a worker node in the orchestration platform to run the custom resource on the worker node in response to the custom resource definition generation event; and
   distributing, by the computer, using the data partition proxy, data to the custom resource definition controller running the custom resource on the worker node to ensure that no overlapping of data processing tasks exists in the orchestration platform in response to the controller meta-controller deploying the custom resource definition controller on the worker node.

2. The computer-implemented method of claim 1 further comprising:
   deleting, by the computer, using the controller meta-controller, the custom resource definition controller in the worker node in response to the custom resource no longer existing in the orchestration platform.

3. The computer-implemented method of claim 1 further comprising:
   receiving, by the computer, using the pre-API server hook, the request to generate the custom resource in the orchestration platform from a client device corresponding to a user via a network;
   retrieving, by the computer, using the pre-API server hook, the custom resource definition corresponding to the custom resource from the custom resource definition repository in response to receiving the request to generate the custom resource from the client device; and
   generating, by the computer, using the pre-API server hook, the custom resource definition in the API server of the orchestration platform.

4. The computer-implemented method of claim 1 further comprising:
   generating, by the computer, using the pre-API server hook, the custom resource in the API server based on the custom resource definition.

5. The computer-implemented method of claim 1 further comprising:
   retrieving, by the computer, using the CRD meta-controller, the custom resource definition controller corresponding to the custom resource definition from the CRD controller configuration repository; and deploying, by the computer, using a controller meta-controller, the custom resource definition controller on the worker node of a cluster of worker nodes in the orchestration platform.

6. The computer-implemented method of claim 1 further comprising:

deploying, by the computer, using the API server, the custom resource on the worker node having the custom resource definition controller, the custom resource definition controller manages the custom resource running on the worker node to process data corresponding to an application workload of a service provided by the orchestration platform.

7. The computer-implemented method of claim 1 further comprising:

detecting, by the computer, using the controller meta-controller, that the custom resource and the custom resource definition corresponding to the custom resource no longer exist in the API server of the orchestration platform; and deleting, by the computer, using the controller meta-controller, the custom resource definition controller in the worker node automatically to decrease a footprint of the orchestration platform in response to detecting that the custom resource and the custom resource definition no longer exist in the API server of the orchestration platform.

8. The computer-implemented method of claim 1, wherein the data partition proxy does not redistribute existing incoming data to a new custom resource definition controller in response to the controller meta-controller deploying the new custom resource definition in the orchestration platform, but instead continues to distribute the existing incoming data to an existing custom resource definition controller that is already handling the existing incoming data, and wherein the data partition proxy distributes new incoming data to the new custom resource definition as the existing custom resource definition controller is already handling the existing incoming data.

9. A computer system for provisioning an orchestration platform, the computer system comprising:

a bus system;

a storage device connected to the bus system, wherein the storage device stores program instructions; and a processor connected to the bus system, wherein the processor executes the program instructions to:

provide event-driven provisioning of the orchestration platform that includes a pre-application programming interface (API) server hook, a custom resource definition (CRD) meta-controller, a controller meta-controller, and a data partition proxy;

use the pre-API server hook, which is located in a control plane in front of an API server of the orchestration platform, to preprocess a request to generate a custom resource in the orchestration platform to automate handling of the custom resource, the pre-API server hook generates a custom resource definition corresponding to the custom resource based on information retrieved from a custom resource definition repository and generates the custom resource based on the custom resource definition;

monitor, using the CRD meta-controller, for a custom resource definition generation event to manage a custom resource definition controller corresponding to the custom resource definition, the CRD meta-controller retrieves the custom resource definition controller and its configuration from a CRD controller configuration repository to deploy the custom resource definition controller on a worker node in the orchestration platform to run the custom resource on the worker node in response to the custom resource definition generation event; and distribute, using the data partition proxy, data to the custom resource definition controller running the custom resource on the worker node to ensure that no overlapping of data processing tasks exists in the orchestration platform in response to the controller meta-controller deploying the custom resource definition controller on the worker node.

10. The computer system of claim 9, wherein the processor further executes the program instructions to:

delete, using the controller meta-controller, the custom resource definition controller in the worker node in response to the custom resource no longer existing in the orchestration platform.

11. The computer system of claim 9, wherein the processor further executes the program instructions to:

receive, using the pre-API server hook, the request to generate the custom resource in the orchestration platform from a client device corresponding to a user via a network;

retrieve, using the pre-API server hook, the custom resource definition corresponding to the custom resource from the custom resource definition repository in response to receiving the request to generate the custom resource from the client device; and generate, using the pre-API server hook, the custom resource definition in the API server of the orchestration platform.

12. The computer system of claim 9, wherein the processor further executes the program instructions to:

generate, using the pre-API server hook, the custom resource in the API server based on the custom resource definition.

13. The computer system of claim 9, wherein the processor further executes the program instructions to:

retrieve, using the CRD meta-controller, the custom resource definition controller corresponding to the custom resource definition from the CRD controller configuration repository; and deploy, using a controller meta-controller, the custom resource definition controller on the worker node of a cluster of worker nodes in the orchestration platform.

14. A computer program product for provisioning an orchestration platform, the computer program product comprising a computer-readable storage medium having program instructions embodied therewith, the program instructions executable by a computer to cause the computer to perform a method of:

providing, by the computer, event-driven provisioning of the orchestration platform that includes a pre-application programming interface (API) server hook, a custom resource definition (CRD) meta-controller, a controller meta-controller, and a data partition proxy;

using, by the computer, the pre-API server hook, which is located in a control plane in front of an API server of the orchestration platform, to preprocess a request to generate a custom resource in the orchestration platform to automate handling of the custom resource, the pre-API server hook generates a custom resource definition corresponding to the custom resource based on information retrieved from a custom resource definition repository and generates the custom resource based on the custom resource definition;

monitoring, by the computer, using the CRD meta-controller, for a custom resource definition generation event to manage a custom resource definition controller corresponding to the custom resource definition, the CRD meta-controller retrieves the custom resource definition controller and its configuration from a CRD controller configuration repository to deploy the custom resource definition controller on a worker node in the orchestration platform to run the custom resource on the worker node in response to the custom resource definition generation event; and distributing, by the computer, using the data partition proxy, data to the custom resource definition controller running the custom resource on the worker node to ensure that no overlapping of data processing tasks exists in the orchestration platform in response to the controller meta-controller deploying the custom resource definition controller on the worker node.

15. The computer program product of claim 14 further comprising:
deleting, by the computer, using the controller meta-controller, the custom resource definition controller in the worker node in response to the custom resource no longer existing in the orchestration platform.

16. The computer program product of claim 14 further comprising:
receiving, by the computer, using the pre-API server hook, the request to generate the custom resource in the orchestration platform from a client device corresponding to a user via a network;

retrieving, by the computer, using the pre-API server hook, the custom resource definition corresponding to the custom resource from the custom resource definition repository in response to receiving the request to generate the custom resource from the client device; and generating, by the computer, using the pre-API server hook, the custom resource definition in the API server of the orchestration platform.

17. The computer program product of claim 14 further comprising:
generating, by the computer, using the pre-API server hook, the custom resource in the API server based on the custom resource definition.

18. The computer program product of claim 14 further comprising:
retrieving, by the computer, using the CRD meta-controller, the custom resource definition controller corresponding to the custom resource definition from the CRD controller configuration repository; and deploying, by the computer, using a controller meta-controller, the custom resource definition controller on the worker node of a cluster of worker nodes in the orchestration platform.

19. The computer program product of claim 14 further comprising:
deploying, by the computer, using the API server, the custom resource on the worker node having the custom resource definition controller, the custom resource definition controller manages the custom resource running on the worker node to process data corresponding to an application workload of a service provided by the orchestration platform.

20. The computer program product of claim 14 further comprising:
detecting, by the computer, using the controller meta-controller, that the custom resource and the custom resource definition corresponding to the custom resource no longer exist in the API server of the orchestration platform; and deleting, by the computer, using the controller meta-controller, the custom resource definition controller in the worker node automatically to decrease a footprint of the orchestration platform in response to detecting that the custom resource and the custom resource definition no longer exist in the API server of the orchestration platform.

* * * * *